(12) United States Patent  (10) Patent No.: US 6,386,410 B1
Van Dusen et al.  (45) Date of Patent: May 14, 2002

(54) VEHICLE MOUNTED ARTICLE CARRIER RACK

(75) Inventors: Donn Van Dusen, Loma Rica; Jerry Hughes, Laguna Niguel, both of CA (US)

(73) Assignee: Steel Horse Automotive Accessories, Inc., Compton, CA (US)

( * ) Notice: Subject to any disclaimer, the term of this patent is extended or adjusted under 35 U.S.C. 154(b) by 0 days.

(21) Appl. No.: 09/699,831

(22) Filed: Oct. 30, 2000

(51) Int. Cl.[7] ................................................. B60R 9/10
(52) U.S. Cl. ........................ 224/509; 224/519; 224/535; 224/536; 224/924
(58) Field of Search ................................ 224/282, 502, 224/509, 519, 535, 536, 924

(56) References Cited

U.S. PATENT DOCUMENTS

| | | |
|---|---|---|
| 3,326,434 A | 6/1967 | Cheadle |
| 3,753,520 A | 8/1973 | Bodde |
| 3,804,308 A | 4/1974 | Bodde |
| 4,002,364 A | 1/1977 | Eshelman |
| 4,434,922 A | 3/1984 | Brandsen et al. |
| 4,561,575 A | 12/1985 | Jones |
| 4,863,080 A | 9/1989 | Graber |
| 4,875,608 A | 10/1989 | Graber |
| 4,946,084 A | 8/1990 | Britto |
| 4,948,021 A | 8/1990 | Murphy et al. |
| 5,004,133 A | 4/1991 | Wyers |
| 5,094,373 A | 3/1992 | Lovei |
| 5,114,120 A * | 5/1992 | Bartelt et al. ............... 224/509 |
| 5,518,159 A * | 5/1996 | DeGuevara ................. 224/282 |
| 5,593,076 A * | 1/1997 | Biondo ....................... 224/485 |
| 5,664,717 A * | 9/1997 | Joder .......................... 224/502 |
| 5,845,832 A * | 12/1998 | Eichmann .................... 224/495 |
| 6,123,498 A * | 9/2000 | Surkin ........................ 224/509 |
| 6,199,735 B1 * | 3/2001 | Cothern et al. .............. 224/509 |
| 6,234,372 B1 * | 5/2001 | Rivera ......................... 224/497 |
| 6,237,823 B1 * | 5/2001 | Stewart et al. .............. 224/282 |

* cited by examiner

*Primary Examiner*—Stephen K. Cronin
(74) *Attorney, Agent, or Firm*—Oppenheimer Wolff & Donnelly, LLP

(57) ABSTRACT

The vehicle mounted article carrier rack mounts equipment to the back end of a vehicle. A base arm is formed having an acute angle such that when the base arm is secured to a receiver hitch of a vehicle, the base arm sweeps back towards the rear of the vehicle. A swing arm is pivotally connected to the base arm and also pivotally connected to a vertical article carrier arm. The swept-back design assures that the article carrier rack remains within the width of the vehicle when in a closed position, yet when open, swings out of the way to allow access to the vehicle's rear cargo area. The vertical article carrier arm pivots downwards to lower articles to, or raise articles from, the ground.

39 Claims, 11 Drawing Sheets

VEHICLE MOUNTED ARTICLE CARRIER RACK

BACKGROUND OF THE INVENTION

The invention relates generally to racks attachable to vehicles for carrying bicycles and the like, and more particularly to an improved swinging rack having a swept-back design.

Swing-out vehicle mounted rack systems have been proposed to make it more convenient to access the rear of a vehicle while a bicycle or other equipment is mounted thereon. U.S. Pat. No. 5,094,373 to Lovci describes a sports equipment rack that extends parallel to the vehicle's bumper and swings out away from the vehicle to provide access to the vehicle's rear cargo area. In Lovci's parallel swing-out design, the lower support arm and swing arm extend to the end of the vehicle's rear bumper. This extension provides clearance for accessing the vehicle's rear cargo area when the rack is swung out to its open position. However, it is dangerous to drive with an object extending beyond the width of the bumper, in fact, some states have laws restricting the distance a mounted object can extend beyond the width of a vehicle. Further, it is easy for passersby to injure their legs on the protruding object. Also vehicles utilizing Class III hitches vary in widths from approximately 66.7" to approximately 84". Therefore it would be difficult to design a parallel swing-out rack that would not extend beyond the end of the bumper for this range of vehicle widths.

SUMMARY OF THE INVENTION

A general object of the present invention is to provide a vehicle mounted article carrier rack having a strong yet compact and lightweight design that will not extend beyond the width of the vehicle.

The unique swept-back design of the rack provides tremendous advantages over the parallel swing-out designs of the prior art. Unlike the parallel swing-out designs, the swept-back design assures that, when in the closed position, the rack will not extend beyond the width of the vehicle for vehicles having a wide variety of widths. The rack provides a "universal fit" for the majority of vehicles having Class III hitches. This allows a user of the rack to change vehicles and still use the same rack.

A vehicle utilizing the rack also much easier to maneuver than a vehicle utilizing a parallel swing-out rack designed to extend parallel to the vehicle's bumper. The swept-back design keeps the rack and the articles closer to the center of the vehicle rather than sticking out far beyond the end of the bumper. Further, because of the swept-back design, the rack and the articles are closer to the bumper as they extend away from the center of the vehicle. Having the rack and articles closer to the bumper at the sides rather than protruding behind and far beyond the vehicle's width is especially beneficial when trying to back into a parking space.

The back-bend allows for a shorter structural arms, while still allowing the rack to open far enough to permit full access to the vehicle's rear cargo area. The shorter structural arms results in shorter lever arms and less torque on joints, resulting in an inherently stronger design. This means that a greater load can be placed on the rack. Also, the lower torques means that thinner, weaker, material can be used in manufacturing the rack resulting in cost savings and a lighter rack which much more convenient to place onto and remove from a vehicle.

The backbend can be an arched bend, providing additional strength, savings in material costs, and manufacturing simplicity compared to the multi-piece designs of the prior art.

This and other advantages are achieved by the article carrier rack of the present invention. One embodiment of the invention includes a base arm having a pivot end and a mounting end for removable mounting to a vehicle. An article carrier arm is operatively connected to the base arm. An acute angle is formed between the mounting end and the pivot end of the base arm. A swing arm has a pivot end and a carrier support end. The swing arm pivot end is pivotally connected to the base arm pivot end. The article carrier arm has an article carrier end and a base end. The article carrier base end is structurally connected to the swing arm carrier support end. The acute angle is between approximately 70 degrees and 80 degrees and is formed by an arched bend of the base arm. The swing arm opens to an angle approximately supplementary to the acute angle, or approximately 100 degrees to 110 degrees relative to the base arm. The mounting end of the base arm is adapted to be secured to a receiver hitch of a vehicle. The article carrier arm is secured to the swing arm to remain substantially vertical when said mounting end of the base arm is secured to a receiver hitch of a vehicle. The base arm is adapted to extend only within the width of a vehicle to which it is secured. In a closed position of the rack, the swing arm is secured to the base arm to prevent the swing arm from swinging relative to the base arm. An article attachment subassembly is mounted to the article carrier end of the article carrier arm. The article attachment subassembly is adapted to secure at least one bicycle to the article carrier. The article carrier base end is pivotally connected to the swing arm carrier-support end. A support base is mounted to the carrier-support end of the swing arm. The article carrier arm is pivotally connected to the swing arm through the support base for rotation thereabout. The support base has a pivot stop to limit the pivot motion of the article carrier arm to less than 90 degrees relative to the support base. The swing arm pivots about a first axis substantially orthogonal to a second axis about which the article carrier arm pivots. The article carrier arm is pivotally connected to the support base by means of a pivot pin passing through the article carrier arm and the support base and is secured against pivoting by a pin passing through the article carrier arm and the support base.

The present invention also includes the combination of the article carrier rack with a vehicle, where the acute angle formed between the mounting end and the pivot end of the base arm causes the base arm to be swept-back towards the vehicle.

The present invention further includes a method for using the article carrier rack with a vehicle by securing a bicycle to the vehicle and accessing a cargo or passenger area of the vehicle by pivoting a swing arm portion of the rack from a position oblique relative to a bumper of the vehicle to a position wherein a longitudinal access of the swing arm forms an obtuse angle relative to the bumper.

These objects as well as other objects, features and advantages of the invention will become more apparent to those skilled in the art from the following description with reference to the accompanying drawings.

BRIEF DESCRIPTION OF THE DRAWINGS

Detailed description of the preferred embodiment of the invention will be made with reference to the accompanying drawings.

DETAILED DESCRIPTION OF THE PREFERRED EMBODIMENTS

Disclosed herein is a detailed description of some of the best presently known modes of carrying out the invention. This description is not to be taken in a limiting sense, but is made merely for the purpose of illustrating the general principles of the invention. The overall organization of the present detailed description is for the purpose of convenience only and is not intended to limit the present invention.

Figure 1:
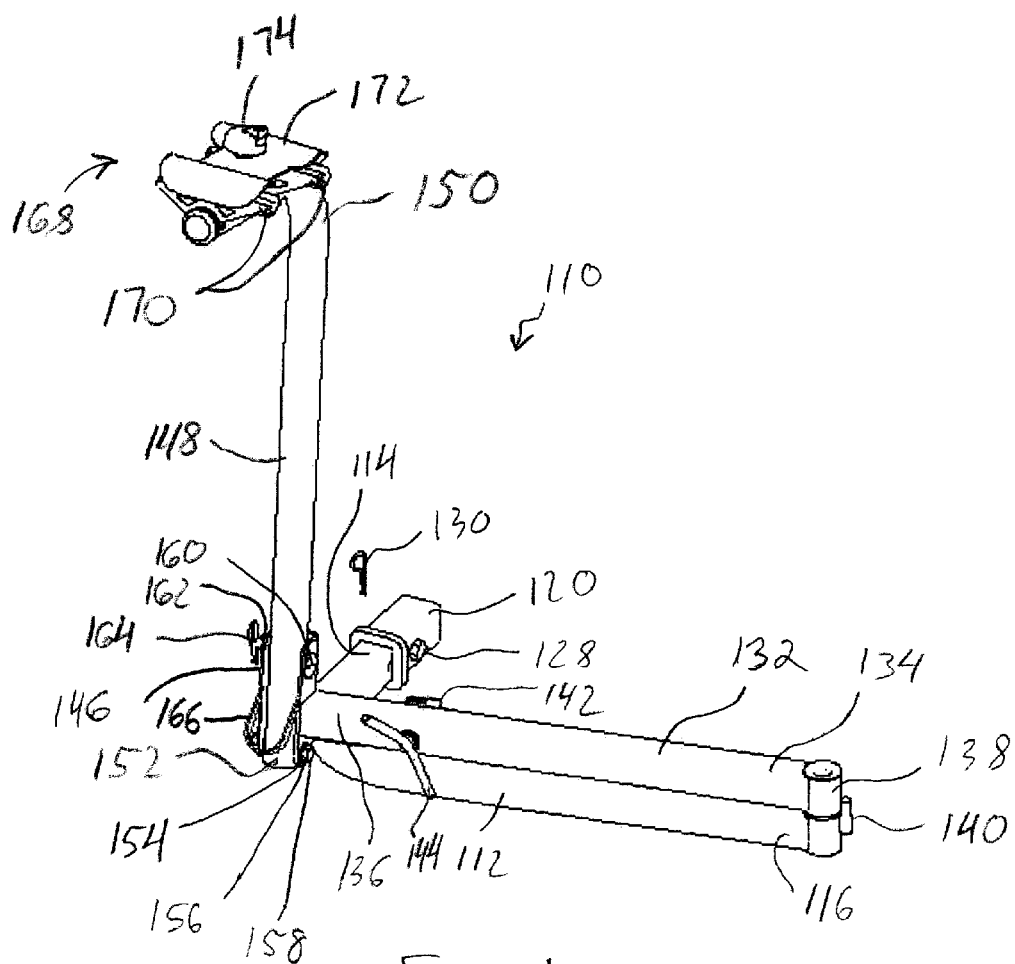
FIG. 1 is a perspective view of the article carrier rack of the present invention, shown in a closed position.
Figure 2:
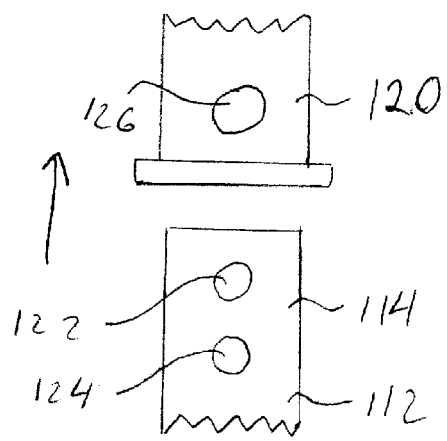
FIG. 2 is a fragmentary side elevational view of the vehicle receiver hitch and a mounting end of the base arm.
Figure 3:
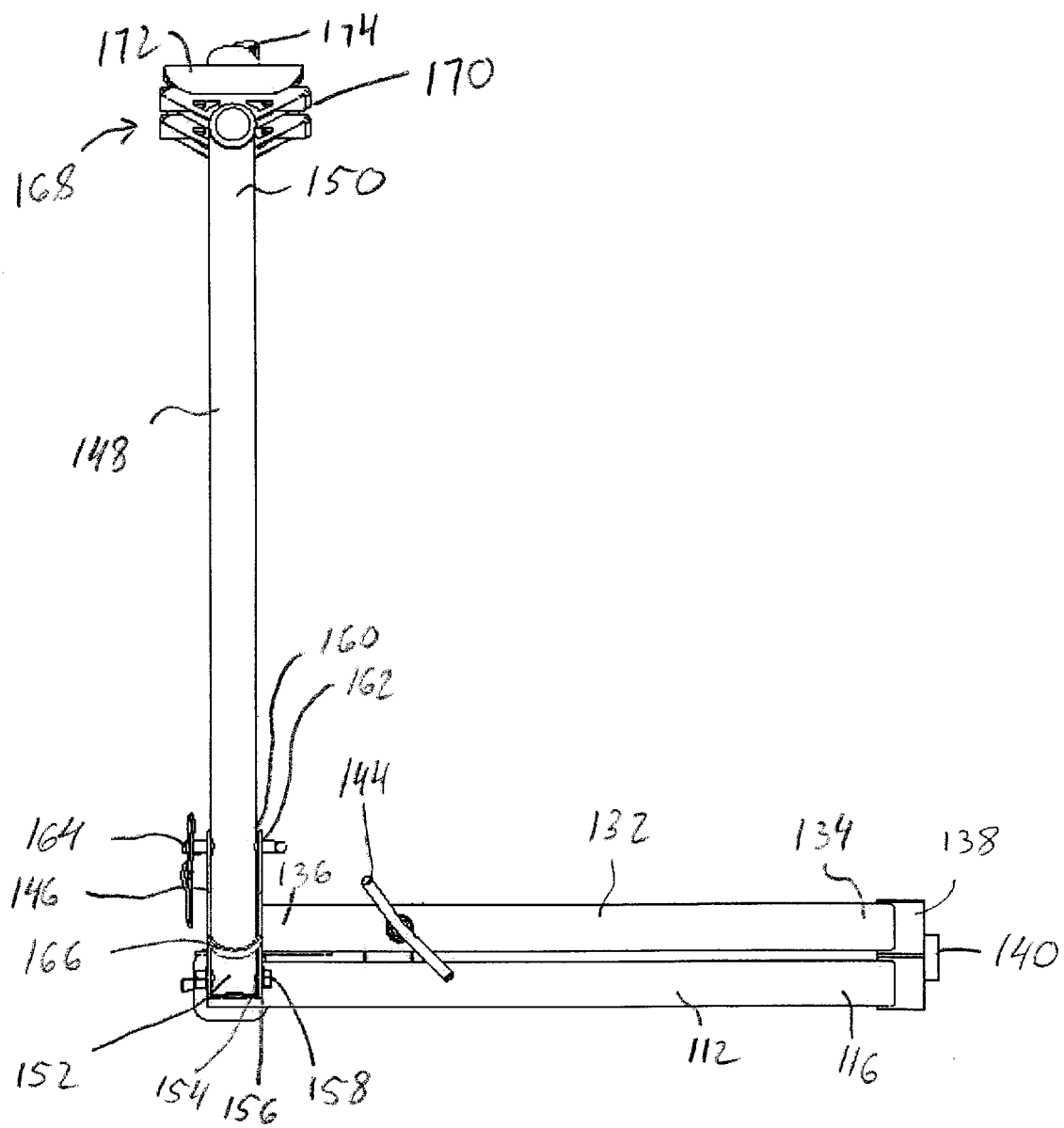
FIG. 3 is a front elevational view of the article carrier rack, shown in a closed position.
Figure 4:
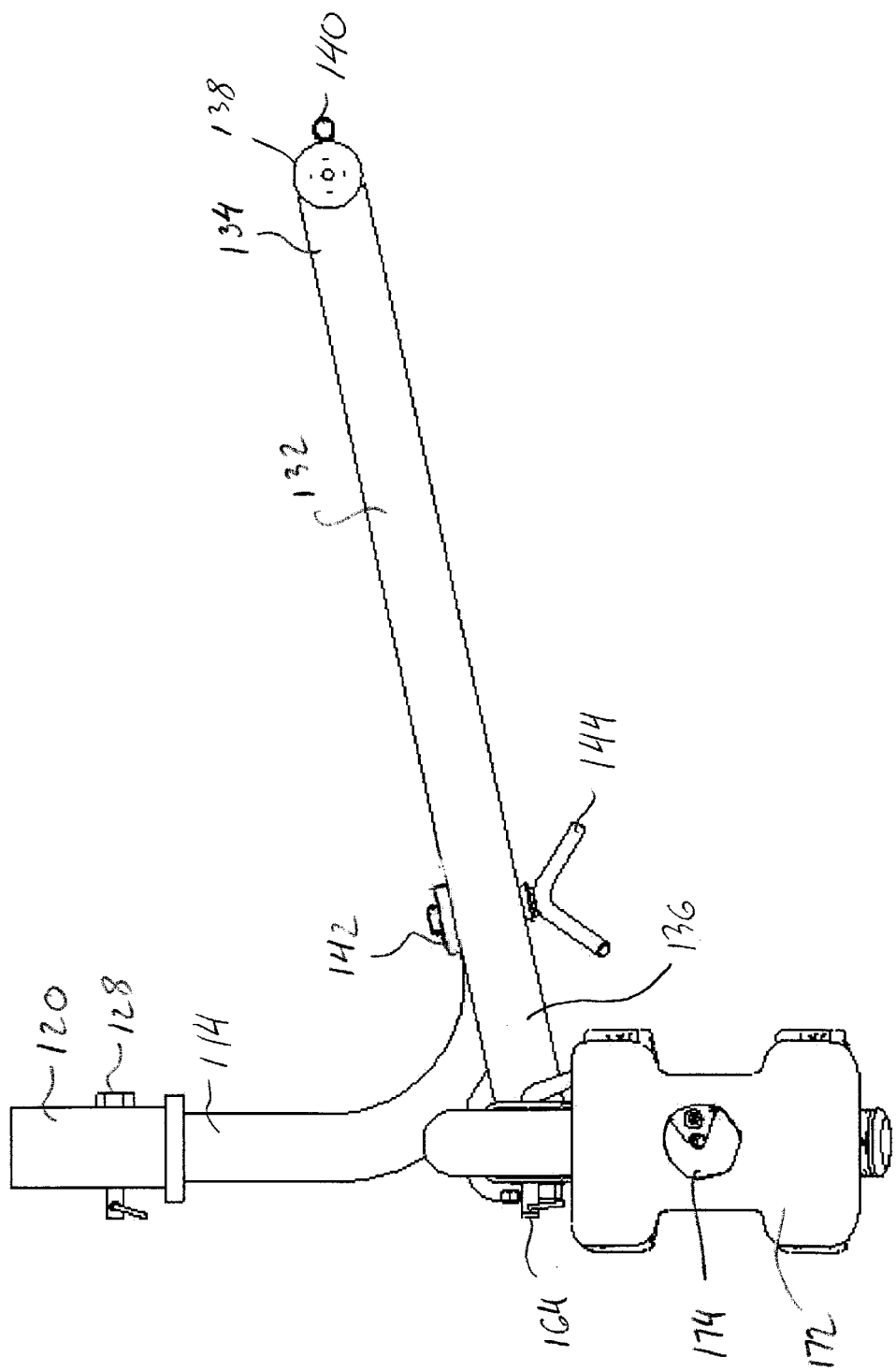
FIG. 4 is a top plan view of the article carrier rack, shown in a closed position.

FIGS. 1–4 show a rack 110. A stationary draw bar or base arm 112 has a mounting end 114 and a pivot end 116. An acute angle 117 is formed between. the mounting end 114 and the pivot end 116 (see FIG. 5). In one embodiment, the acute angle is between 70 degrees and 80 degrees, although in other embodiments the angle can be less or greater. The rack 110 is mounted to a vehicle 118 (See FIGS. 6–9) by removably securing the base arm mounting end 114 to a receiver hitch 120. As illustrated in FIG. 2, a hole 122 or 124 passing through the base arm 112 giving minimum clearance between the base arm 112 and the vehicle 118, is chosen for alignment with a receiver hitch pin hole 126. An anti-wobble bolt 128 is threaded from the passenger side of the vehicle, through the holes 122 or 124 and 126 until the bolt head is tightened firmly, and flush with the side of the receiver hitch. The anti-wobble bolt is then secured with a clevis pin 130 or a nylon nut. The receiver hitch 120 can be a Class III style rear hitch. Other methods can be used for attaching the rack 110 to the vehicle 118. For example, one or more connections to the bumper or other parts of the vehicle can be used to secure the rack 110 to the vehicle 118.

A swing arm 132 has a pivot end 134 and a carrier-support end 136. The swing arm pivot end 134 is pivotally connected to the base arm pivot end 116 by means of a hinge 138. The swing arm 132 can pivot about the hinge 138 between the closed position illustrated in FIG. 4 and the open position illustrated in FIG. 5. A stop pin 140 is fixed to the base arm 112 and prevents the swing arm 132 from swinging open to more than an angle 177 relative to the base arm 112. In one embodiment, the stop pin 140 stops the swing arm 132 when it has opened to for an angle supplementary to the acute angle 117. Here, a supplementary angle is an angle that when added to a given angle makes 180 degrees. Thus, when the acute angel 117 is 70 degrees the angle 177 will be 110 degrees, and when the acute angel 117 is 80 degrees the angle 177 will be 100 degrees.

Also fixed to the base arm 112 is a stop plate 142. The stop plate 142 prevents the swing arm 132 from closing further than the position shown in FIG. 4. A threaded bolt 144 is disposed to pass through corresponding threaded holes passing through the swing arm 132 to secure the swing arm 132 to the base arm 112 in the closed position illustrated in FIG. 4. Alternatively, a keyed drop pin can be dropped through keyed holes passing through the swing arm 132 and base arm 112 to secure the swing arm to the base arm.

A support base or support base 146 is constructed at the carrier-support end of the swing arm 132. A vertical tube or article carrier arm 148 has an article carrier end 150 and a base end 152. The article carrier arm 148 is pivotally connected to the swing arm 132 through the support base 146 for rotation relative to the swing arm 132. Passing through the article carrier arm 148 are threaded holes 154. Passing through the support base 146 are corresponding threaded holes 156. These threaded holes 154, 156 are aligned and a threaded bolt 158 provides the pivotal connection between the article carrier arm 148 and the swing arm 132. Also passing through the support base 146 and the article carrier arm 148 are corresponding keyed holes 160, 162 through which a keyed drop pin 164 passes to secure the article carrier arm against pivoting. Also attached to the support base 146 is a pivot stop 166 which, when the keyed drop pin 164 is removed, limits the pivoting of the article carrier arm 148 to less than 90 degrees relative to the support base 146. The swing arm 132 pivots about an axis substantially orthogonal to the axis about which the article carrier arm 148 pivots.

An article attachment subassembly 168 is mounted to the article carrier end 150 of the article carrier arm 148. The illustrated article attachment subassembly 168 is adapted to secure two bicycles. The top tubes of the bicycles are placed into the troughs 170 in the attachment subassembly 168. A locking top clamp 172 having a locking knob 174 secures the bicycle top tubes in the troughs 170, securing the bicycles to the rack 110. Other article attachment subassemblies can similarly be mounted to the rack 110. For example, article attachment subassemblies adapted to carry skies, surfboards, construction materials, luggage or other articles can be mounted on the rack 110.

Figure 6:
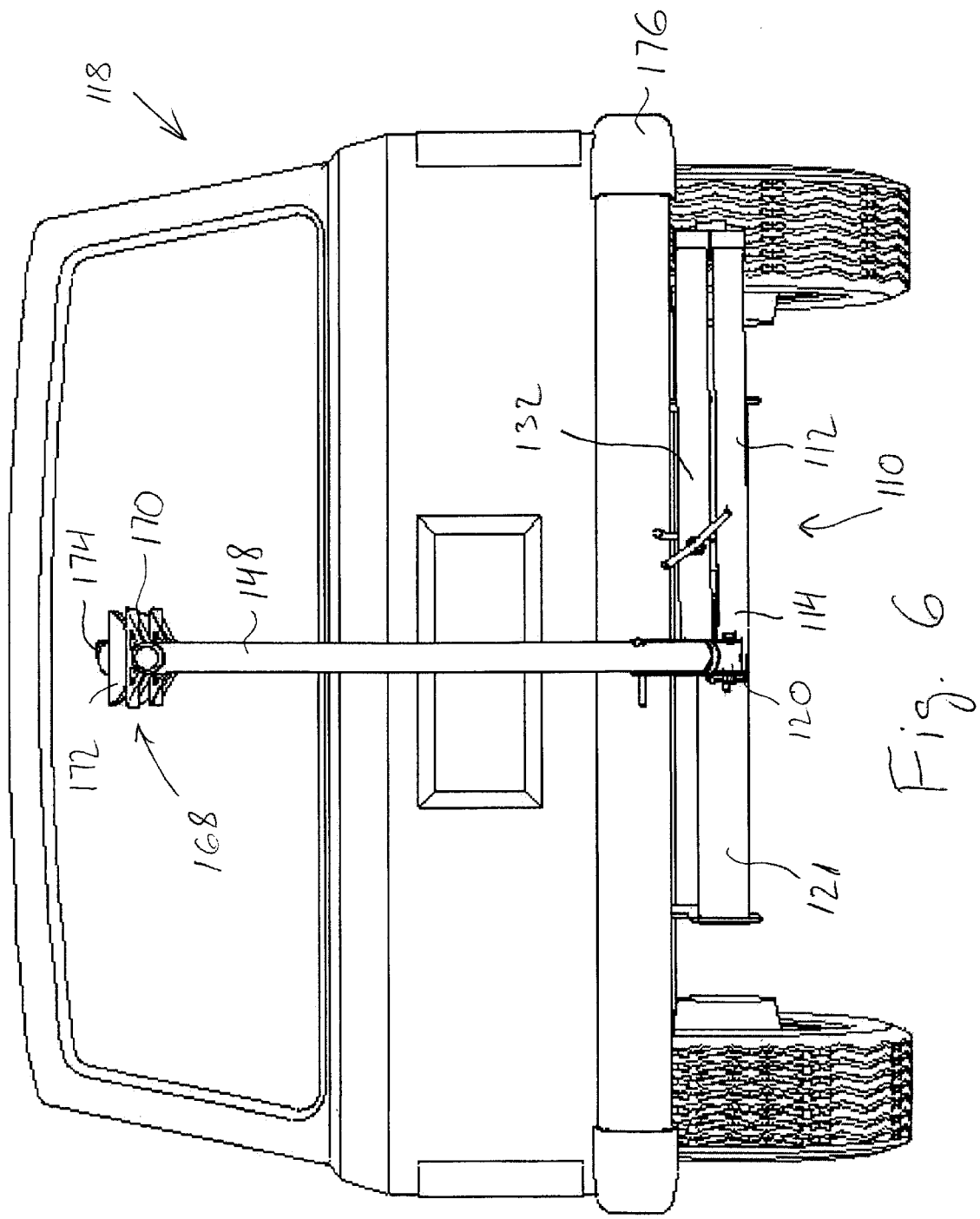
FIG. 6 is a front elevational view of the vehicle mounted article carrier rack mounted to a vehicle and in a closed position.
Figure 11:
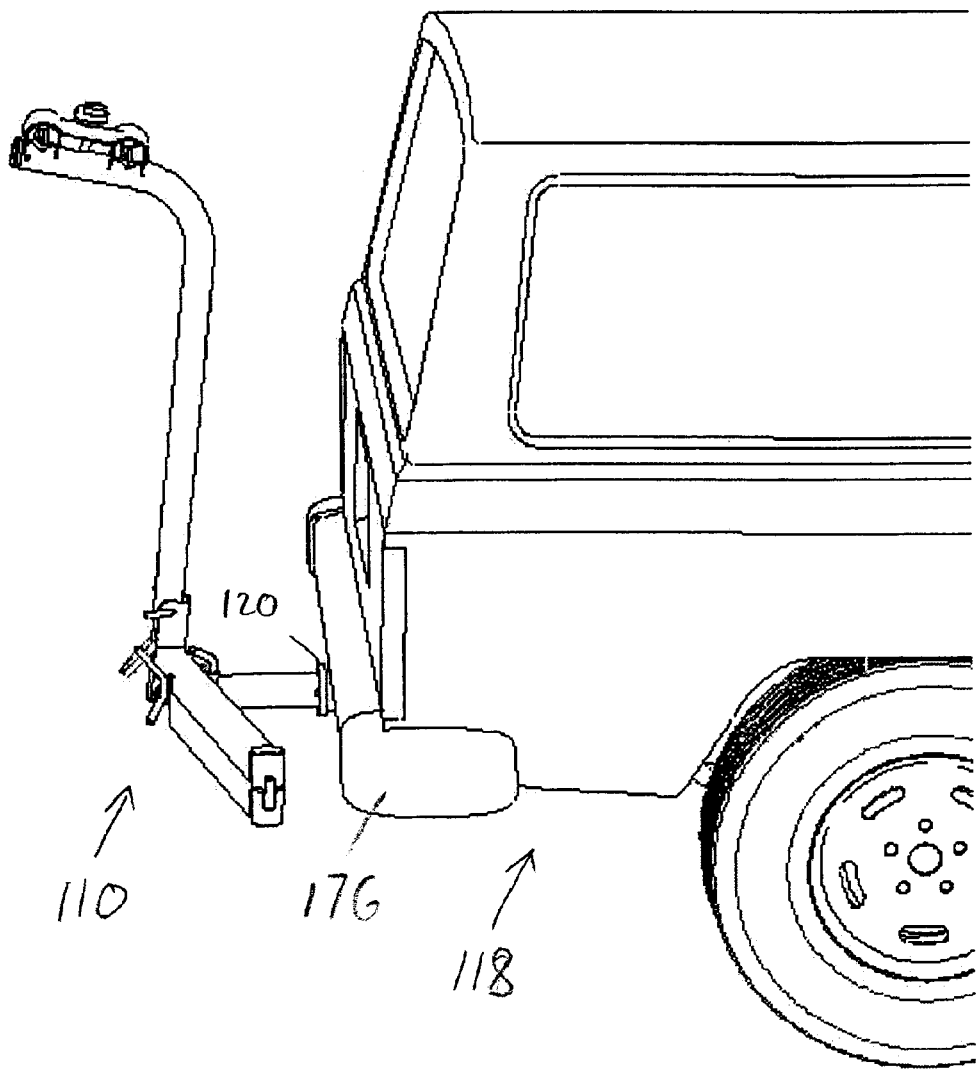
FIG. 11 is a side elevational view of the of the vehicle mounted article carrier rack mounted to a vehicle in which the receiver hitch is mounted directly below the bumper.
Figure 12:
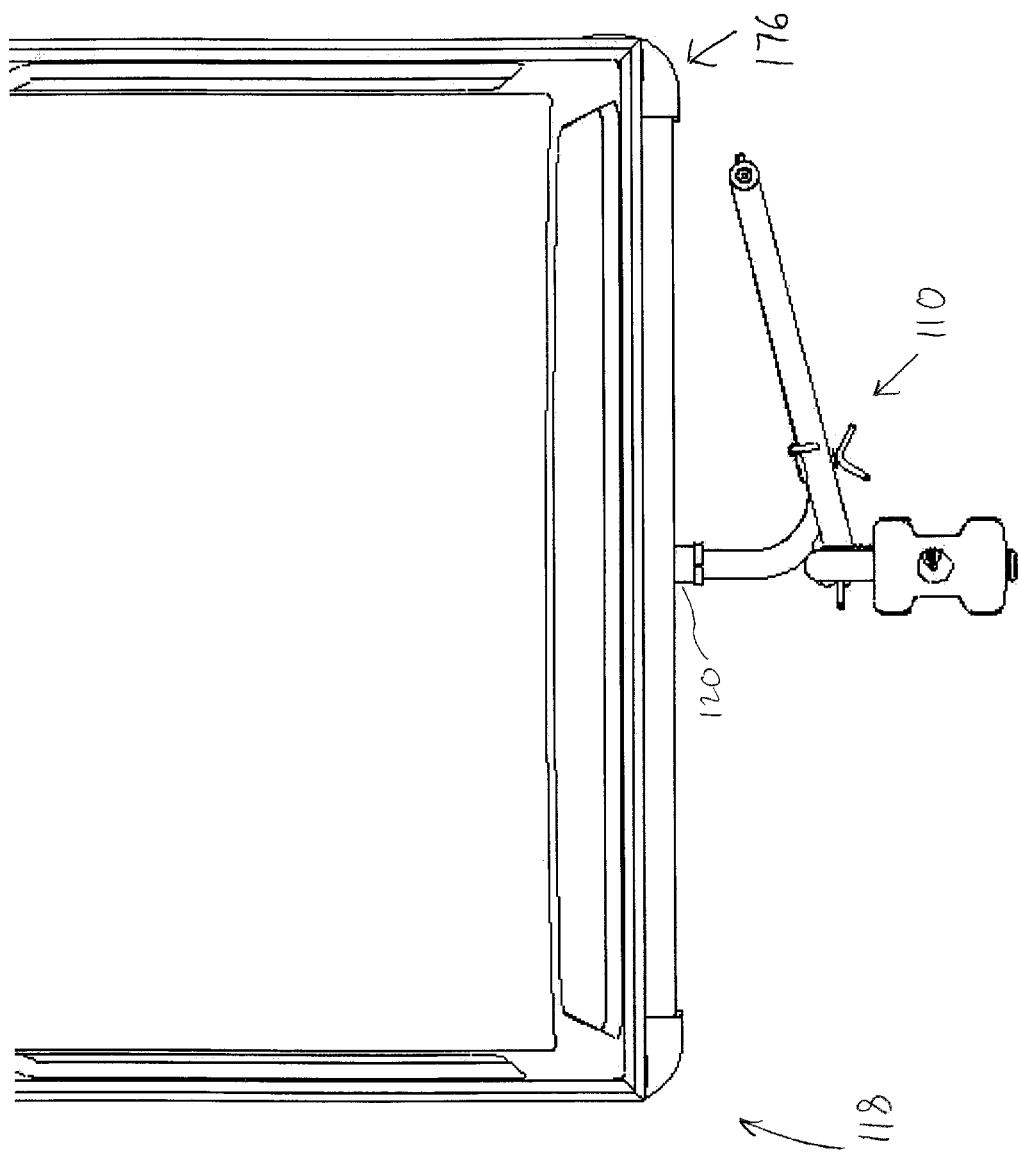
FIG. 12 is top plan view of the of the vehicle mounted article carrier rack mounted to a vehicle in which the receiver hitch is mounted directly below the bumper.

FIGS. 6–9 show the rack 110 mounted to the vehicle 118. When the rack 110 is mounted to the vehicle 118, the acute angle 117 formed in the base arm 112 causes the base arm to be swept-back towards the vehicle. In one embodiment, the rack 110 extends out approximately eight inches to the rear of the receiver hitch 120 along a longitudinal axis 178 of the receiver hitch 120 and base arm 112 (see FIG. 9). The receiver hitch itself can extend various distances from the rear of the vehicle depending on the particular receiver hitch, receiver hitch mounting method and the type of vehicle. For example, the receiver hitch 120 illustrated in FIGS. 6–9 is attached to a hitch mount 121 and does not extend very far beyond the bumper. For this hitch configuration, as illustrated in FIG. 6, the base arm 112 and swing arm 132 lie beneath the level of the bumper. Alternatively, the trailer hitch 120 can extend from the bumper or from just below the bumper. For example, FIGS. 11 and 12 show the trailer hitch 120 extending from just below the bumper 176. In this mounting configuration, the rack 110 is positioned higher relative to the bumper 176 and extends further behind the vehicle 118. The rack 110 will function properly with a wide range of receiver hitch configurations.

The base arm 112 extends approximately 31 inches to the side of the longitudinal axis 178, along a longitudinal axis 180 of the base arm 112. The 31-inch extension has been found to maximize the number of vehicles that can conveniently use the rack 110, but other shorter or longer lengths can be used for other vehicles. The acute angle 117 is between 70 degrees and 80 degrees resulting in a backbend of 10 degrees to 20 degrees relative to the centerline of the bumper 176. The backbend brings the carrier rack 110 back near bumper at the hinge 138. Also, the hinge 138 remains well within the width of the bumper 176, or in other words, the hinge 138 does not extend beyond the end of the bumper when in the closed position.

Figure 5:
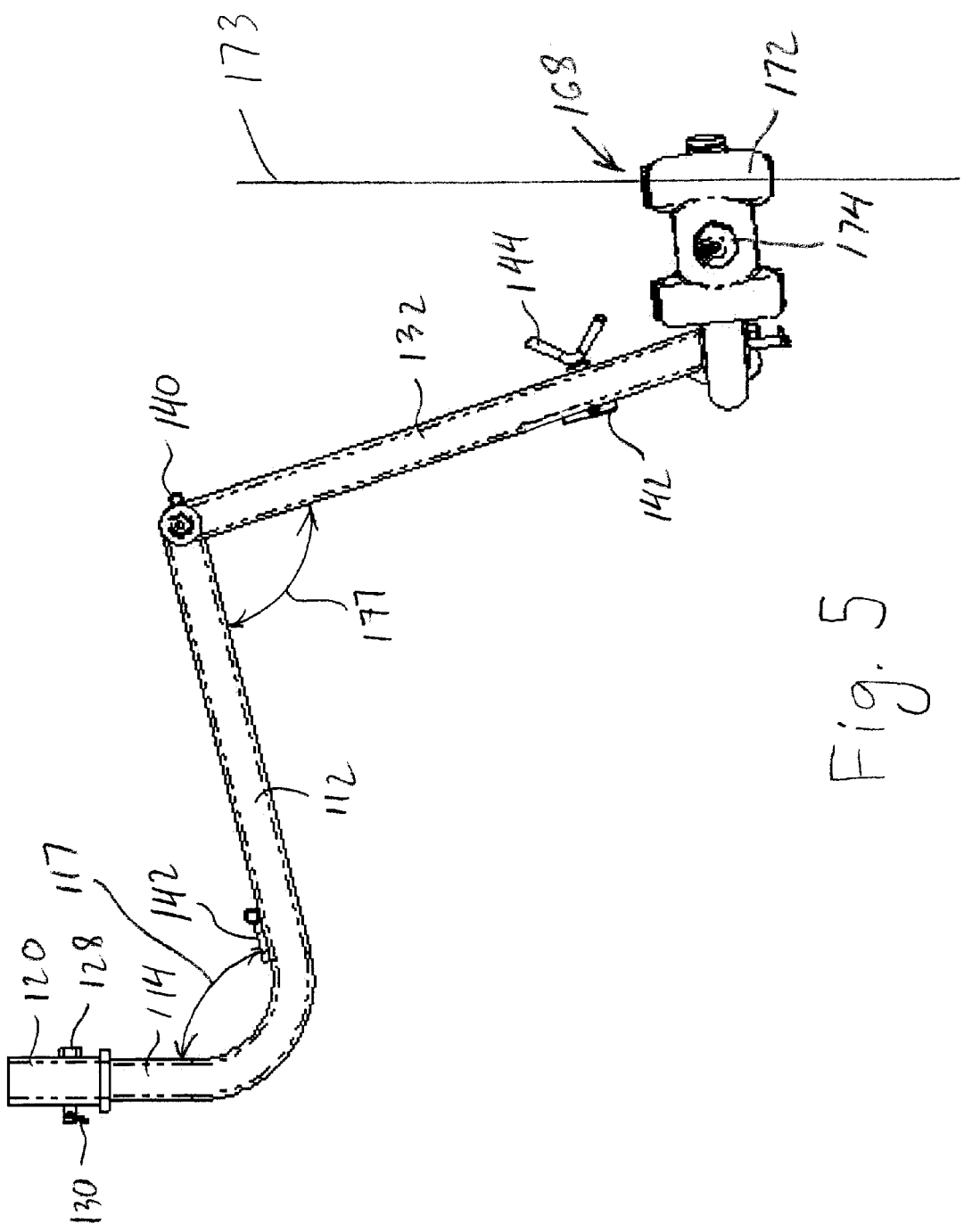
FIG. 5 is a top plan view of the article carrier rack, shown in an open position.
Figure 9:
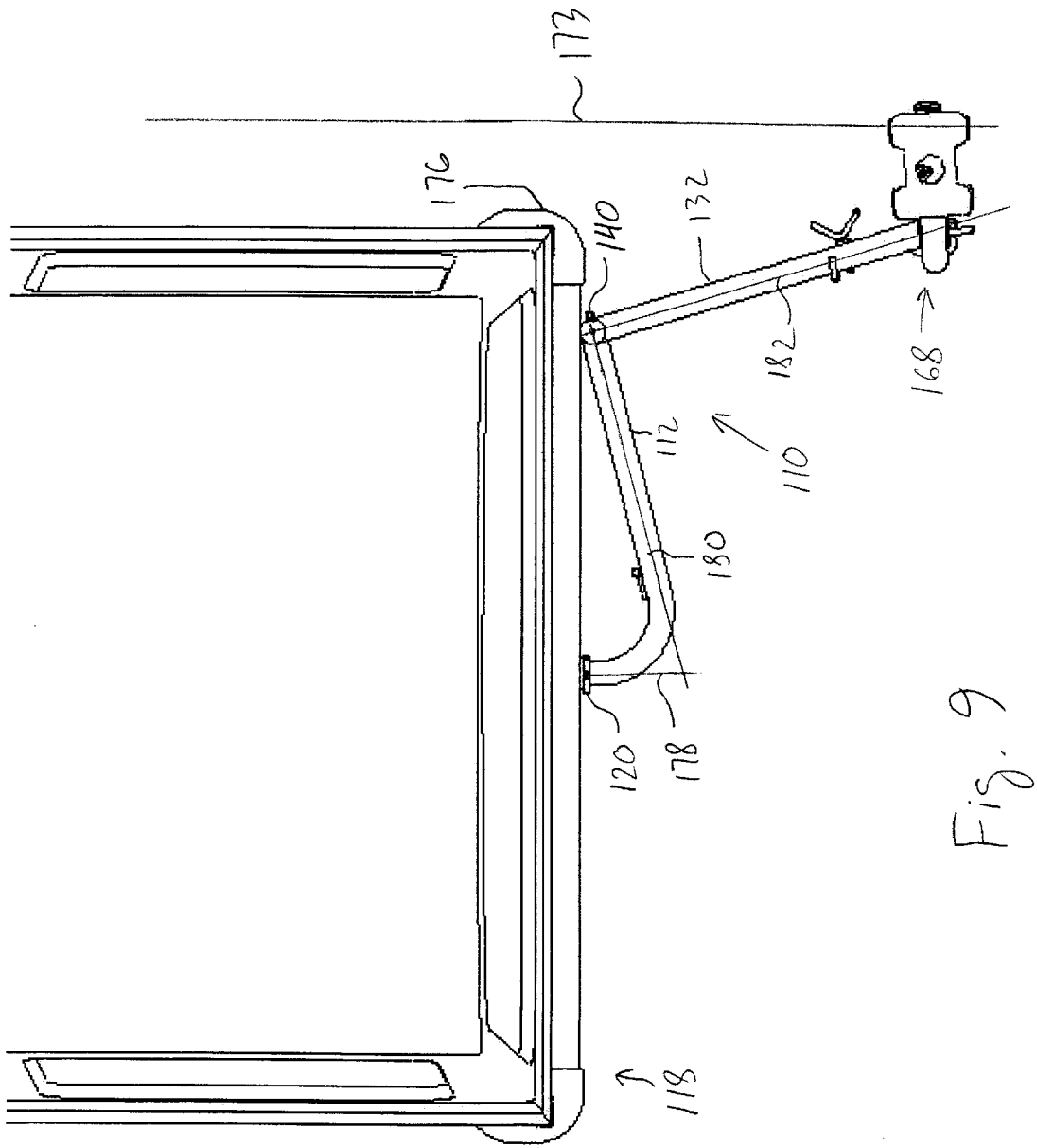
FIG. 9 is a top plan view of the vehicle mounted article carrier rack mounted to a vehicle and in an open position.

The threaded bolt 144 is released to allow the swing arm 132 to swing open, providing clearance to access the rear cargo area of the vehicle. As described above, in one embodiment the swing arm 132 sweeps out the angle 177 (see FIG. 5) supplementary to the acute angle 117. A longitudinal axis 173 is illustrated in FIG. 5 and can represent the longitudinal axis of a bicycle's top tube or the longitudinal axis of another long article. When the rack 110 is in its closed position, the longitudinal axis 173 extends parallel to the rear of the vehicle. When the rack 110 is in an open position, due to the supplementary angles 117, 177, the longitudinal axis 173 extends parallel to the side of the vehicle 118. FIG. 9 shows the longitudinal axis 173 extending parallel to and along the side of the vehicle 118. Thus, the supplementary angles 117, 117 prevent a long article from hitting the side of the vehicle when the rack 118 is in the open position illustrated in FIG. 9.

Figure 10:
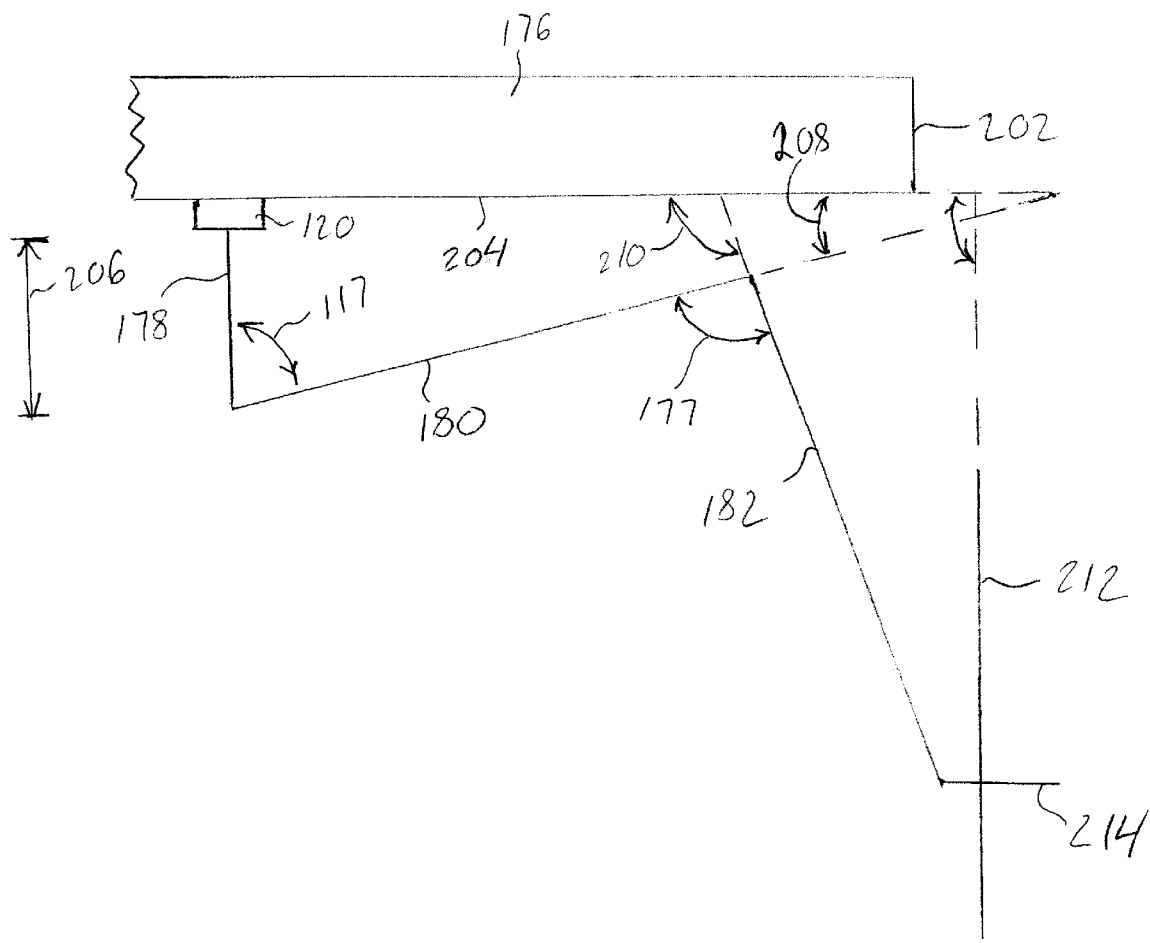
FIG. 10 is a schematic diagram showing centerlines of the various arms and the bumper edge for the article carrier rack mounted to a vehicle when the base arm is swept back at a 20 degree angle.

FIG. 10 is a schematic diagram illustrating the relative lengths and angles of the rack 110 for the embodiment in which the base arm is swept back at a 20 degree angle. The bumper 176 has an end 202 and a rear edge 204. The longitudinal axis 178 of the receiver hitch 120 and base arm 112 extends approximately 31 inches from the hitch as illustrated by reference number 206. The base arm longitudinal axes 178, 180 form an angle 117 of 70 degrees with each other and the base arm longitudinal axis 1.80 forms an angle 208 of 20 degrees with the bumper rear edge 204. In its open position, the swing arm longitudinal axis 182 forms an angle 177 of 110 degrees relative to the base arm longitudinal axis 180. The angle 177 is supplementary to the angle 117. The swing arm longitudinal axis 182 forms an angle 210 of 130 degrees with the bumper rear edge 204. The longitudinal axis of a bicycle's top tube 173 is shown extending from an axis 214 of the article attachment subassembly 168 and intersecting the extended rear edge of the bumper at an angle of approximately 90 degrees and well past the end of the bumper 202.

When using the rack 110, the articles are secured to the article attachment subassembly 168. To secure the rack 110 for driving, the swing arm 132 is secured to the base arm 112 using the threaded bolt 144. When the vehicle 118 is an SUV, for example, access to the rear cargo area of the vehicle 118 is achieved, without removing the articles from the rack 110, by releasing the treaded bolt 144, and swinging out the swing arm 132. The swing arm 132 is swung out far enough to allow the rear hatch of the vehicle 118 to be opened. Typically the swing arm portion of the rack is swung from a position oblique relative to the longitudinal axis of the bumper to a position wherein the longitudinal axis 182 of the swing arm forms an obtuse angle relative to the bumper.

The keyed drop pin 164 can be removed to allow the article carrier arm 148 to pivot around the threaded bolt 158. The article attachment subassembly 168 can then be lowered to the articles rather than raising the articles to the subassembly 168. After attaching the articles to the subassembly 168, the article carrier arm 148 can be pivoted back to the vertical position and the threaded bolt 158 replaced. The process can be reversed for removing the articles.

Figure 7:
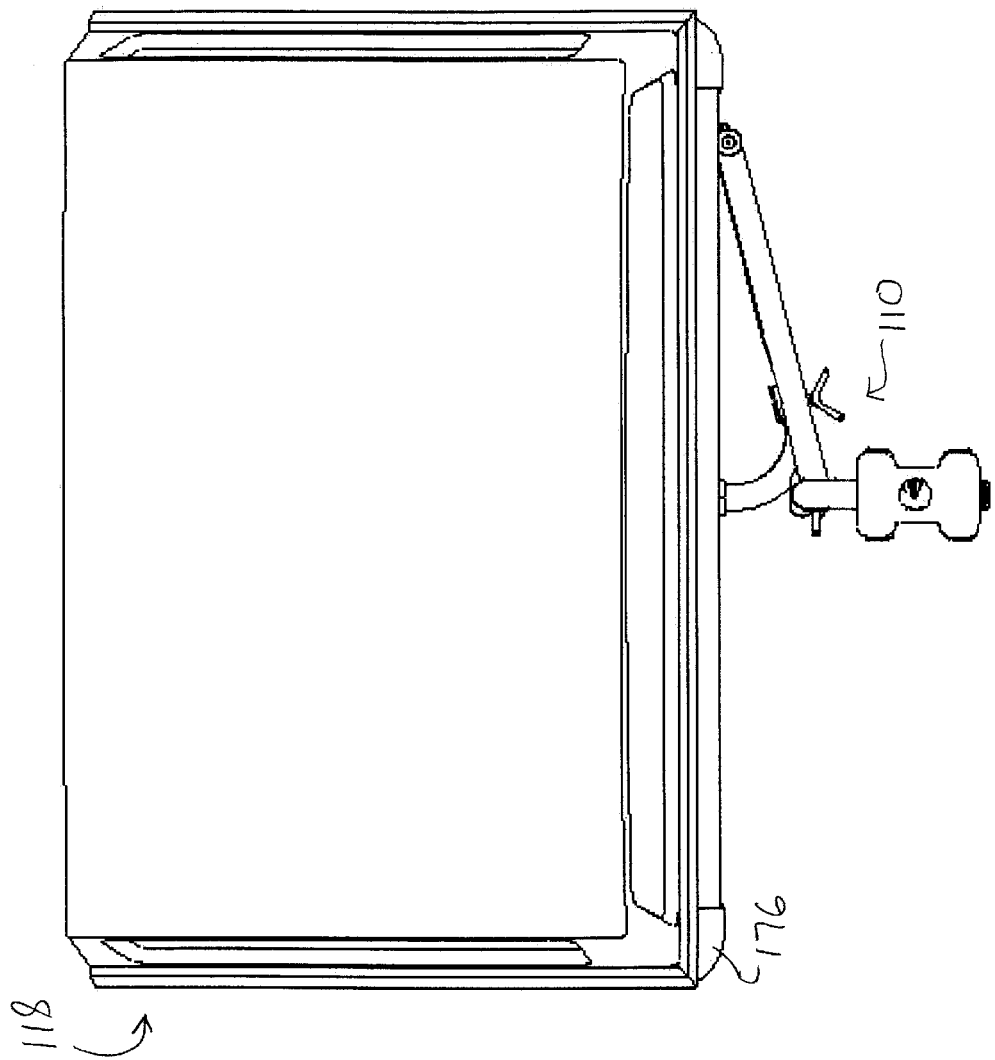
FIG. 7 is a top plan view of the vehicle mounted article carrier rack mounted to a vehicle and in a closed position.
Figure 8:
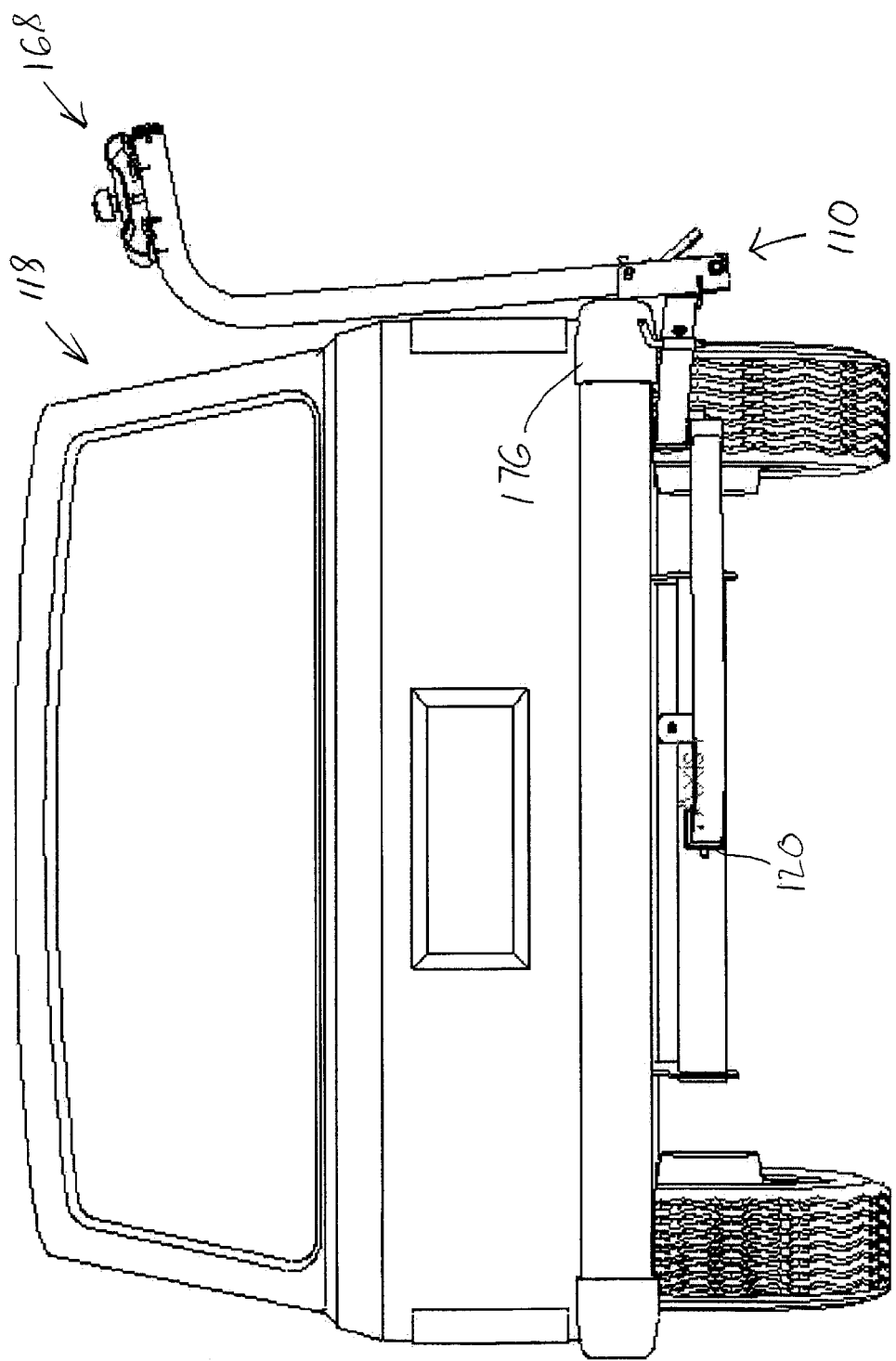
FIG. 8 is front elevational view of the vehicle mounted article carrier rack mounted to a vehicle and in an open position.

The unique backbend design of the rack 110 assures that, when in the closed position illustrated in FIG. 7, the rack will not extend beyond the end of the vehicle for vehicles having a wide variety of widths. This allows a user of the rack to change vehicles and still use the same rack.

A vehicle utilizing the rack 110 is much easier to maneuver than a vehicle utilizing a parallel swing-out rack designed to extend parallel to the vehicle's bumper. The swept-back design keeps the rack 110 and the articles closer to the center of the vehicle rather than sticking out far beyond the end of the vehicle's bumper. Further, because of the swept-back design, the rack 110 and the articles are closer to the bumper as they extend away from the center of the vehicle. Having the rack and articles closer to the bumper at the sides rather than protruding behind and far beyond the vehicle's width is especially beneficial when trying to back into a parking space.

The rack 110 is inherently stronger and requires less material than racks of the prior art. The back-bend allows for a shorter base arm 112 than the prior art does. In the prior art, the hinge 138 must extend beyond the width of the bumper 176. Due to the combined backbend angle and the open-position angle between the base arm 112 and swing arm 132, the base arm 112 can be much shorter than that used in the prior art while still providing adequate cargo access when the rack is in its open position. This means that less material and thinner material can be used while maintaining strength. A lighter rack is much more convenient to place onto and remove from the receiver hitch 120.

The shorter arms and smaller angles result in shorter lever arms and less torque exerted on the rack 110 and hitch 120 compared to a parallel swing-out design. When in the open position illustrated in FIG. 9, the lever arm between the article attachment subassembly 168 and the receiver hitch 120 is much shorter than the lever arm in the parallel swing-away racks of the prior art. Also, the shorter swing arm 132 results in a shorter lever arm between the article attachment subassembly 168 and the hinge 138, so less torque is exerted on the hinge 138. Less torque is also exerted on the hinge 138 since the lever arm between the hinge 138 and the hitch 120 is shorter.

The single piece arched bend in the base arm 112 also provides additional strength, savings in material costs, and manufacturing simplicity compared to the multi-piece designs of the prior art.

The above-cited lengths and angles are intended as an illustrative example only. Other values can also be used as determined by one skilled in the art. Also, in other embodiments by varying the lengths and angles, the rack can be used with many different makes and models of SUVs, automobiles, trucks, RV's, campers, etc. In some embodiments, the rack maintains the swept-back feature but does not swing out, for example, when the carrier arm is attached directly to the base bar. The rack can extend to either side of the vehicle, and in some embodiments can even be mounted to the front of the vehicle. Accordingly, the invention is not limited to the precise embodiment described in detail hereinbefore.

We claim:

1. An article carrier rack comprising:
a base arm having a pivot end and a mounting end for removable mounting to a vehicle;
an article carrier arm operatively connected to the base arm;
wherein an acute angle is formed between the mounting end and the pivot end of the base arm.

2. The rack of claim 1, wherein:
the acute angle is formed by an arched bend of the base arm.

3. The rack of claim 1, wherein:
the acute angle is between approximately 70 degrees and 80 degrees.

4. The rack of claim 3, wherein:
the swing arm opens to an angle of between approximately 100 degrees and 110 degrees relative to the base arm.

5. The rack of claim 1, further comprising:
an article attachment subassembly mounted to the article carrier end of the article carrier arm.

6. The rack of claim 5, wherein:
the article attachment subassembly is adapted to secure at least one bicycle to the article carrier.

7. The rack of claim 1, further comprising:
a swing arm having a pivot end and a carrier-support end, the swing arm pivot end pivotally connected to the base arm pivot end; and
wherein the article carrier arm has an article carrier end and a base end, the article carrier base end pivotally connected to the swing arm carrier-support end.

8. The rack of claim 7, wherein:
the swing arm pivots about a first axis substantially orthogonal to a second axis about which the article carrier arm pivots.

9. The rack of claim 1, wherein:
the mounting end of the base arm is adapted to be secured to a receiver hitch of a vehicle.

10. The rack of claim 9, wherein:
the base arm is adapted to extend only within the width of a vehicle to which it is secured.

11. The rack of claim 9, wherein:
the base arm is adapted to not extend beyond the end of the bumper for vehicles having rear bumper widths of 66.7 inches to 84 inches.

12. The rack of claim 1, further comprising:
a support base mounted to the carrier-support end of the swing arm; and
wherein the article carrier arm is pivotally connected to the swing arm through the support base for rotation thereabout.

13. The rack of claim 12, wherein:
the support base has a pivot stop to limit the pivot motion of the article carrier arm to less than 90 degrees relative to the support base.

14. The rack of claimed 12, wherein:
the article carrier arm is pivotally connected to the support base by means of a pivot pin passing through the article carrier arm and the support base and is secured against pivoting by a pin passing through the article carrier arm and the support base.

15. The rack of claim 1, further comprising:
a swing arm having a pivot end and a carrier support end, the swing arm pivot end pivotally connected to the base arm pivot end; and
wherein the article carrier arm has an article carrier end and a base end, the article carrier base end structurally connected to the swing arm carrier support end.

16. The rack of claim 15, wherein.
the swing arm opens to form an angle supplementary to the acute angle.

17. The rack of claim 15, wherein:
the mounting end of the base arm is adapted to be secured to a receiver hitch of a vehicle; and
the article carrier arm is secured to the swing arm to remain substantially vertical when said mounting end of the base arm is secured to a receiver hitch of a vehicle.

18. The rack of claim 15, wherein:
in a closed position of the rack, the swing arm is secured to the base arm to prevent the swing arm from swinging relative to the base arm.

19. A vehicle and article carrier rack combination comprising:
a base arm having a mounting end and a pivot end, the base arm mounting end removably attaching the base arm to a vehicle;
an article carrier arm operatively connected to the base arm;
wherein an acute angle is formed between the mounting end and the pivot end of the base arm so that the base arm is swept-back towards the vehicle.

20. The combination of claim 19, wherein:
the acute angle is between approximately 70 degrees and 80 degrees.

21. The combination of claim 19, wherein:
the acute angle is formed by an arched bend of the base arm.

22. The combination of claim 19, wherein:
the mounting end of the base arm is secured to a receiver hitch of the vehicle.

23. The combination of claim 19, wherein:
the base arm extends only to within the width of the vehicle to which it is secured.

24. The combination of claim 19, wherein:
the vehicle has a rear bumper width of 66.7 inches to 84 inches and the base arm is adapted to not extend beyond the end of the bumper.

25. The combination of claim 19, further comprising:
an article attachment subassembly mounted to the article carrier end of the article carrier arm.

26. The combination of claim 25, wherein:
the article attachment subassembly is adapted to secure at least one bicycle to the article carrier rack.

27. The combination of claim 26, wherein:
the article carrier arm is pivoted downward to lower a bicycle carried by the article carrier rack.

28. The combination of claim 19, further comprising:
a swing arm having a pivot end and a carrier support end, the swing arm pivot end pivotally connected to the base arm pivot end; and
wherein the article carrier arm has an article carrier end and a base end, the article carrier base end structurally connected to the swing arm carrier support end.

29. The combination of claim 28, wherein:
the swing arm opens to form an angle supplementary to the acute angle.

30. The combination of claim 28, wherein:
the swing arm opens to an angle of between approximately 100 degrees and 110 degrees relative to the base arm.

31. The combination of claim 28, wherein:

in a closed position of the rack, a pin passes trough the swing arm and the base arm to prevent the swing arm from swinging relative to the base arm.

32. The combination of claim 28, wherein:

the swing arm and article carrier arm swing into an open position to provide access to a cargo area of the vehicle.

33. The combination of claim 19, further comprising:

a swing arm having a pivot end and a carrier-support end, the swing arm pivot end pivotally connected to the base arm pivot end; and wherein the article carrier arm has an article carrier end and a base end, the article carrier base end pivotally connected to the swing arm carrier-support end.

34. The combination of claim 33, wherein:

the swing arm pivots about a first axis substantially orthogonal to a second axis about which the article carrier arm pivots.

35. The combination of claim 33, further comprising:

a support base mounted to the carrier-support end of the swing arm; and wherein the article carrier arm is pivotally connected to the swing arm through the support base for rotation thereabout.

36. The combination of claim 35, wherein:

the support base has a pivot stop to limit the pivot motion of the article carrier arm to less than 90 degrees relative to the support base.

37. The combination of claim 35, wherein:

the article carrier arm is pivotally connected to the support base by-means of a pivot pin passing through the article carrier arm and the support base and is secured against pivoting by a drop-pin passing through the article carrier arm and the support base.

38. The combination of claim 35, wherein:

the article carrier is secured to the support base to remain substantially vertical.

39. A method for using a article carrier rack with a vehicle, comprising the steps of:

securing a bicycle to the vehicle;

accessing a cargo or passenger area of the vehicle by pivoting a swing arm portion of the rack from a position oblique relative to a bumper of the vehicle to a position wherein a longitudinal axis of the swing arm forms an obtuse angle relative to the bumper.

* * * * *